Feb. 16, 1960 T. N. CUMMINGS ET AL 2,925,102
FILLING APPARATUS INCLUDING INJECTION VALVE
Filed July 5, 1957
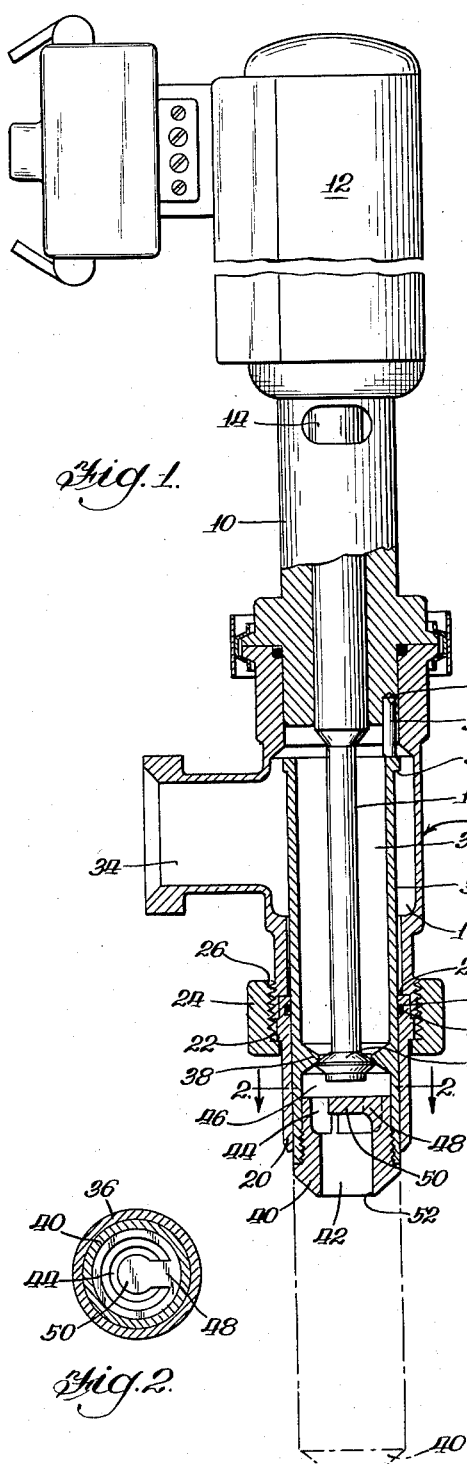
Fig. 1.
Fig. 2.
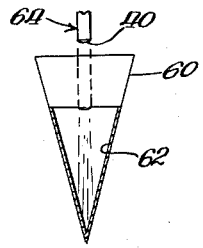
Fig. 3.
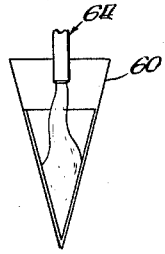
Fig. 4.
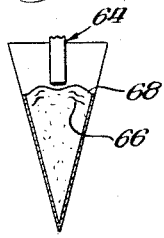
Fig. 5.
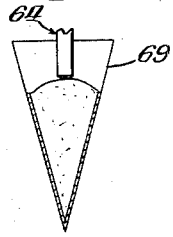
Fig. 6.
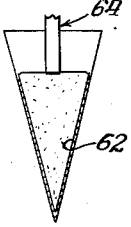
Fig. 7.
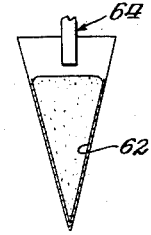
Fig. 8.
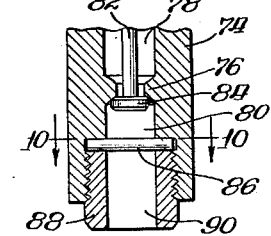
Fig. 9.
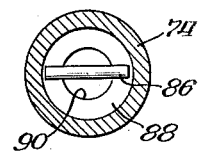
Fig. 10.
INVENTOR.
Thomas N. Cummings
Benjamin R. Peterson, Jr.
Thomas B. Shiu
By Nugen A. Stone
Atty.

United States Patent Office 2,925,102
Patented Feb. 16, 1960

2,925,102

FILLING APPARATUS INCLUDING INJECTION VALVE

Thomas N. Cummings, Chicago, Benjamin R. Peterson, Jr., Wheaton, and Thomas B. Shiu, Chicago, Ill., assignors of one-fourth to Nicholas A. Cummings, Chicago, Ill.

Application July 5, 1957, Serial No. 670,183

12 Claims. (Cl. 141—263)

This invention relates to a method of extruding ice cream into a mass so as to form a top of selected configuration, and to an ice cream extruding valve and assembly for practicing this method. This application is a continuation in part of copending application Serial No. 474,684, filed December 13, 1954, for a Method of Making a Wrapped Ice Cream Cone, filed by the present applicants.

This invention has two major objects: firstly, to place a rounded or a non-level top configuration on a mass or pile of ice cream in a container, and secondly, to eliminate air pockets in the bottom of the container. Both of these objects are to be attained while using a comparatively hard ice cream, by which is meant one that is likely to form an upwardly directed column of ice cream at the moment of cut-off. This column topples over and disfigures the top of the mass. The industry calls this a "tail." It is attributable to three things: firstly, as above indicated, to the hardness of the ice cream, which usually varies directly with a falling temperature; secondly, the height from which the ice cream is extruded; and thirdly, the diameter and the length of the duct between the actual cut-off point of the valve and the orifice of the nozzle.

The problem attacked by the first object of this invention is avoided in the ice cream industry by extruding the ice cream in a highly flowable condition. The ice cream is sufficiently soft so that when it strikes the bottom of the flat bottomed container such as a pint carton or Dixie cup, it spreads out immediately, and does not bridge to form air pockets. When the selected quantity of ice cream has been deposited, the top substantially levels off as does a surface of liquid, and there need be little or no dripping from the nozzle. However, there are confections for which a level top is not wanted, as for example, an ice cream cone. It is desirable that the top of these be perfectly rounded, that is, be a hemisphere. Applicants' nozzle can produce nearly perfect hemispheres at speeds up to 80 to 90 a minute.

The major feature that accomplishes this result is a downwardly moving orifice which as it approaches what will become the ultimate top level of the ice cream, causes the flowing ice cream in the column to push outwardly and then upwardly, being restrained by the side walls of the container. By exactly centering the orifice over the container, and moving the orifice accurately down the vertical axis of the container, the ice cream at the surface will tend to burgeon into a hemisphere under the simple laws of mechanics wherein pressure radially will vary inversely with the distance from the axis source of pressure.

The second object of this invention is to eliminate air pockets in containers when filling them with a comparatively hard material such as rather stiff ice cream. The ice cream industry has always recognized that it is better to fill a container with stiff ice cream than to fill it with highly flowable ice cream. The stiffer the ice cream, the more easily the container is handle. It is easier to cap the container and easier to place it in large cartons for movement into a freezing room, and importantly, the texture of ice cream which is brought to a temperature of 18° F. while being stirred in the freezing chamber is different from and superior to the texture of ice cream which is extruded into a container at 25 to 26° F. and then cooled to 18° F. Ice cream at 18° F. (and this statement varies widely with the particular ingredients of the mix) is still flowable, particularly if it has a high butter fat content. However, if it is extruded from a nozzle into the bottom of a container, it will tend to bridge. It does not flow out to the side walls, but must be pushed. The same feature that is mentioned in connection with the placing of a hemispherical top surface on a mass of ice cream accomplishes the purpose of preventing bridging for comparatively hard ice cream that strikes the bottom of the container. The nozzle goes to the bottom of the container and starts to extrude. It may cause the extrusion at the bottom actually to engulf the side walls in ice cream, or it may be withdrawn as rapidly as the container fills up.

In order to practice the method, it is necessary to provide a valve which closes off the flow of ice cream when the ice cream orifice is at the level to which the ice cream is ultimately to be. A feature of this invention is the provision of a vertically reciprocatable sleeve which carries internally the seat of a valve and of a valve stem which upon a downward movement opens the passageway and positively lowers the nozzle orifice into a container and upon an upward movement closes the seat, and then, positively raises the orifice.

The step of applicants' method which makes possible the elimination of air pockets, the filling of a cone clear to the bottom, and the great speed, is the extrusion of the ice cream from a nozzle under an initial surge of pressure which drops off before closing. This surge of pressure is effected by a retracting of the valve, closed, against the ice cream supply line.

Another object relating to the valve alone is the location of the valve flow cut-off seat close to the extruding orifice so as to minimize the quantity of ice cream that can drop from the orifice after flow ceases. As will become clearer in the description that follows, the effect of stopping the flow and then retracting the orifice, where the ice cream is comparatively stiff is to stop the flow not by the weight of the material separating itself, but by a pulling apart of the ice cream. This pulling apart, which occurs suddenly, takes place in approximately the plane of the nozzle orifice.

These and such other objects as may hereinafter appear are attained in the embodiment of the invention shown in the accompanying drawings, wherein:

Figure 1 is a view partly in section of applicants' valve;

Figure 2 is a view taken on the line 2—2 of Figure 1;

Figure 3 is a schematic illustration showing applicants' valve in position above a paper cup containing a pastry cone;

Figure 4 shows the valve extruding ice cream as it descends into the cup;

Figure 5 shows the valve in its lowermost position;

Figure 6 shows the valve immediately after the valve has closed and the retracting movement is about to commence;

Figure 7 shows the valve at its lowermost position but with the actuating solenoid or plunger having a longer dwell so that the additional ice cream is pushed out to form the flat top of a factory cone;

Figure 8 shows the nozzle moving upwardly from the cone of Figure 7;

Figure 9 shows a modified delivery nozzle; and,

Figure 10 is a sectional view taken on the line 10—10 of Figure 9.

Continuing to refer to the drawings, and particularly to Figures 1 and 2, applicants' valve consists of a main housing 10, in the upper end of which is disposed a twin solenoid 12 whose armature 14 is connected to a valve stem 16. This solenoid is of the type wherein one solenoid lowers the valve stem and the other solenoid raises it. A double acting air valve may replace the solenoid. The interior of the housing 10 provides a guideway to assure true reciprocating alignment for the stem 16. Mounted on the bottom of the stem 16 is a valve disk 18 whose upper wall is frusto-conical.

The lower end of the housing is circular in cross section and to its outer end is fastened a nose 20 having an outwardly directed shoulder 22 which is engaged by a lock nut 24 which is drawn up over exterior threads 26 on the lower end of the housing 10. The nose 20 carries on its upper inner wall, concentrically disposed therein, a circular channel 28 in which is positioned packing 30. The inside diameter of the nose 20 is less than that of the chamber 17 and consequently forms the fixed shoulder 21 which limits the downward movement of the sleeve 36 to be described.

The main chamber of the valve is indicated by the numeral 32 and opening into this chamber at right angles to its major axis is an ice cream inlet 34.

Slideably mounted in the nose 20 is a cylindrical sleeve 36, which in the retracted position shown in Figure 1, has its upper end above the inlet 34. An inwardly directed shoulder 38 spaced from the lower end of the sleeve 36 acts as a seat for the disk 18, the two constituting the flow control elements of the valve. An annular shoulder 35 extends radially from the upper end of the sleeve 36 and upon a downward movement of the sleeve 36 engages the shoulder 21. A pin 37 welded to the upper end of the sleeve 36 seats in a socket 39 and guides the sleeve 36 near the end of its upward movement.

Threaded into the lower end of the sleeve 36 is a nozzle 40 having an internal passageway 42, the upper portion 44 of which opens into the chamber 46. Connected by a bridge 48 to the inner side wall of the nozzle is a stop 50 in axial alignment with the valve stem 16. The orifice of the nozzle is indicated by the numeral 52 and it is quite close to the valve seat 38. The three-quarter circular cross section of the passageway 44 may be seen in Figure 2.

*Making a hemispherical ice cream cone*

Referring now to Figures 3 through 8, each schematically shows a paper cone 60 in which is disposed a pastry cone 62. Applicants' valve is generally identified by the numeral 64 and it may be positioned at the ice cream filling station shown in applicants' copending application Serial No. 379,332, filed September 10, 1953. Upon actuation of the solenoid, the nozzle 40 starts downward and the ice cream immediately appears as a flowing stream. On its downward movement, therefore, there is a downward flow of ice cream relative to the downwardly moving nozzle 40, as illustrated in Figure 3. The bottom of the column of ice cream hits the converging apex of the pastry cone 62 with sufficient impact so as to drive substantially all air out of that portion of the cone. As the nozzle 40 reaches the position shown in Figure 4, the column of ice cream is beginning to build up in the pastry cone. In Figure 5, the nozzle 40 has reached its lowermost point. The small arcuate lines 66 suggest how the ice cream is moving radially and with the aid of the side walls of the pastry cone is commencing to build up a hemispherical top. This is due to the relationship of the particular pressure of the ice cream with the horizontal distance from the orifice over to the side wall of the paper cup. The paper cup being conical, the pressure of the ice cream at the paper surface is becoming steadily less as the paper cup's diameter becomes greater. The result is that at the point 68, the pressure ceases to be sufficient to force the ice cream all of the way over to the side of the cup, and consequently it begins to build into a pile. At the moment that the pile reaches the orifice 52 of the nozzle 40, referring to Figure 1, the stem 16 moves upwardly, closes the valve, and in so doing, the ice cream breaks right at the lip of the nozzle 40. The center of the top of the mass may be a little rough.

Thereafter, the cone is moved to other stations where it is chocolate coated, sprayed with nuts, and ultimately the paper portion 69, referring to Figure 6, is closed and sealed.

In Figures 7 and 8, applicants show how what is called the "factory" cone is obtained. The factory cone has a somewhat flat top, but with a rounded edge as it reaches the inside wall of the paper cone, as shown in Figure 8. This top configuration results from adjusting ice cream pressure, lowering the delivery position of the nozzle, or altering the dwell of the open valve.

By altering the openings in the nozzle, and by moving the nozzle into a cone or other container by other than along its major axis, applicants can obtain various configurations for the top of the mass of ice cream. At the present time, the development of making complete ice cream sundaes in packages has progressed very little. When the package is removed and placed in a dish, the ice cream is not as attractive as where it has been dished out and same flavoring or fresh fruit placed over it, as at a soda fountain. However, applicants' anticipation is that they will be extruding ice cream so as to receive flavoring syrups and the like, including frozen fresh fruits. This will require unusual configurations in the top of the extruded ice cream to receive a particular fruit, such as portions of banana or fresh strawberries, etc. Applicants' nozzle and method of extruding can be used to effect either humps on the ice cream or cavities in the ice cream.

*Method of filling containers*

Applicants' method of filling containers comes into operation only after the valve has been functioned once or twice. Referring to Figure 1, the ice cream is delivered to the inlet 34 directly from the fast freezer. The fast freezer contains a rotating mutator in the freezing chamber, and while the soft mixture is delivered to the freezing chamber by means of a positive pump, that is, a gear pump, the fact is that the pressure on the delivery side of the freezer may be varied by a back pressure created, for example, by closing a delivery valve, without affecting the equilibrium of the system. With this in mind, attention is invited to two facts. Firstly, the interior of the sleeve 36 is always open to the inlet passage 34. When the sleeve is in the position shown in Figure 1, the passageway into the sleeve is restricted. The second fact is that when the valve stem 16 moves upwardly and stops the flow of ice cream when the sleeve 36 and nozzle 40 are in the dotted-line position, not only is there a back pressure created by a closing of the valve, but the return of the sleeve actually pushes ice cream back out through the other orifice 34. Actually, this pushing of ice cream back through the orifice 34 is not appreciable. Rather, the ice cream in the chambers 32 and 17 is somewhat depressed. It comes under considerable pressure.

When the solenoid 12 moves the valve stem 16 downwardly, this pent-up pressure releases itself by creating a fast flow of ice cream into the bottom of the container. This is of great importance for fast operation. When the sleeve 36 and nozzle 40 reach their lowermost position, as will be seen in a moment, where an ice cream cone is being filled, the ice cream is almost at that level.

When a machine such as that shown in copending application Serial No. 379,332 is operating at 80 a minute, it will be understood that applicants' valve extrudes ice cream for less than half a second and it enters and comes out of the upper part of a container in substantially less than one second.

Again referring to Figure 2, when the stem 16 moves downwardly, it strikes the bridge 50 and moves the sleeve 36 downwardly. When the stem reverses direction, it first crosses over the chamber 46 and strikes the under wall of the shoulder 38 to stop the flow of ice cream. On this back movement, the ice cream is compressed, primarily into the sleeve 36.

Modified valve

In Figures 9 and 10, applicants show a modified sleeve and nozzle. The sleeve is identified by the numeral 74 and it has a constant inside diameter excepting for a shoulder 76 which divides the inside of the sleeve 74 into chamber 78 and 80. The stem 82, carrying the valve 84, is smaller in diameter. The movement of the valve 84 in the chamber 80 is limited by a pin 86 which is positioned transversely of an internally threaded recess in the sleeve 74 in which seats the nozzle nipple 88. The nipple 88 carries an internal bore 90 which is a continuation of the chamber 80. This sleeve is much more easily cleaned than that shown in Figure 1, and the performance of the assembly is substantially the same.

In its essential aspects applicants' valve structure is simple in construction and operation, and is easily serviced for hygienic maintainence.

The lower jacket portion 10A of the housing structure can be removed from the upper part 10 by freeing the coupling means 100; and the nozzle portion 20 can be removed by unscrewing the coupling nut 24. Moreover, the threaded orifice members 40 or 88 can be quickly backed out, so that one of the two coupling or abutment members 38, 48 (or 76, 86, Figure 9) for the valve poppet disc or contact part 18 is thereby removed to permit the stem 16 to be dropped.

Having thus described their invention, what the applicants claim is:

1. An ice cream injection filling apparatus including a valve mechanism for forming selected top configurations on pressurized flowable ice cream loaded into packaging containers, said valve comprising an upright jacket, a tubular member slidable vertically in said jacket, a nozzle having an orifice at a lower end of said tubular member which is slidable outwardly of the jacket, a plunger reciprocable axially in said tubular member and including a valve member at an end thereof located adjacent said nozzle and orifice, vertically spaced abutments in the tubular member flanking said valve member, said valve member being closed against the uppermost abutment in the tubular member when the plunger is retracted away from the orifice a predetermined amount and raising the tubular member by continued movement thereafter, and said valve member being open when the plunger is pushed a determined amount downwardly toward the nozzle from said raised closed position, means for reciprocating said plunger said predetermined amounts to open and close the valve and raise and lower the tubular member, and means for connecting said jacket with a source of flowable ice cream under pressure, said tubular member having an opening near its inner end remote from said nozzle which is exposed to inflowing ice cream through said connecting means at least when the tubular member is moved outwardly of the jacket a certain distance less than said predetermined amount.

2. An ice cream filling apparatus including a valve mechanism comprising first and second tubular members in slidable telescoping assembly, entrance means in the first member for connection of the same with a supply of flowable ice cream under pressure, said second member being slidable inwardly of the first member to a normal position substantially restricting passage of ice cream from said entrance into said second member, the second member being slidable to an actuated discharge position outwardly of the first member to admit ice cream in substantial volume into the second member; a nozzle portion on the second member moving with the latter from the normal position thereof to an advanced discharge position; and a combination valve poppet and actuator means including a reciprocable member movable coaxially interiorly of said first and second members between opposite limiting position; a fixed coupling stop and valve member near an end region of said second tubular member which is spaced inwardly of said nozzle portion and which is engagable by said poppet in relatively inward motion of the reciprocable member a certain amount to close the valve and to couple with the second member to draw same inwardly to said normal closing position, said reciprocable member in moving in a direction outwardly of said first and second members engaging a part near said nozzle portion constituting a second coupling stop to drive the second member outwardly of the first member to said discharge position; together with means for reciprocating said reciprocable member.

3. An ice cream filling apparatus including a valve comprising slidably interfitted inner and outer sleeves, a nozzle at an outwardly projectible end of the inner sleeve; an entrance in the outer sleeve for admitting pressurized flowable ice cream from a source of supply; said inner sleeve being slidable outwardly from a normally closed inward position to an outwardly projected discharge position in which position ice cream can flow from said entrance into the interior end of said inner sleeve opposite from said nozzle, means in the inner sleeve spaced from said nozzle to provide a stop; a rod member reciprocable along the lengthwise axis of said sleeve members internally thereof between opposite limits; electromagnetic means for reciprocating said rod member between said limits, and means near an end of the rod member movable with the latter between said nozzle and said stop to drivingly engage one or the other of the same and move the inner sleeve correspondingly either to said normal or said discharge position in accordance with the direction of movement of the reciprocable member.

4. Filling apparatus including a valve for flowable semi-solid material such as ice cream, said valve comprising: an elongated upright jacket having a closure at its upper end, an inlet in its side adjacent said end, and a sleeve slidable longitudinally in the jacket for extension and retraction from the lower end thereof, said sleeve being open at its upper end within the jacket cavity and having a discharge opening at its lower end with spaced abutment means disposed interiorly of the sleeve adjacent said discharge opening, the spacing thereof being in the direction of the long axis of the jacket and sleeve; and actuating means extending into the jacket and sleeve and reciprocable along said axis and having a contact part engageable with one or the other of said spaced abutment means, depending on the direction of axial movement of said reciprocable member, for driving the sleeve inwardly or outwardly of the tubular member, said inlet being adapted for connection with a source of said flowable material under pressure for movement into the jacket and upper end of the sleeve for ejection from said discharge opening.

5. Construction according to claim 4 in which the open upper end of the sleeve is disposed to be substantially in flow-restricting proximity to said closure when the sleeve is retracted to a predetermined position, whereby flow from said inlet through the sleeve is substantially limited.

6. A construction according to claim 4 further characterized in that said reciprocable actuating means is an electromagnetic device having attachment with said jacket, and said reciprocable actuating member has at least partial sliding support in said closure and projects through the latter for operative connection with said electromagnetic device.

7. A valve structure according to claim 4 further characterized in that said contact part on the actuating member is formed as a valve poppet and closes against the innermost of said spaced abutment means on retraction of the reciprocable member a predetermined distance whereby to fully close off the flow path through said sleeve from said open upper end thereof.

8. Filling apparatus including an ice cream valve comprising: a jacket into which ice cream is injected at a predetermined pressure and flow-consistency; a sleeve slidably mounted in said jacket for reciprocation outwardly and inwardly thereof, said sleeve having a nozzle portion at the outwardly moving end thereof; a reciprocable sleeve-driving member entering the jacket substantially coaxially of the sleeve and extending substantially to the nozzle portion of the latter; axially spaced innermost and outermost abutment means in the sleeve adjacent said nozzle; a valve part on said driving member movable with the latter back and forth to engage either the innermost or the outermost abutment means aforesaid depending upon the direction of movement of said driving member; said innermost abutment means lying in the discharge path of ice cream to said nozzle and being formed as a valve member complementary to said valve part on the driving member as a valve means for closing off said path when said driving member is moved retractably in a direction to engage said valve part with said valve member and thereafter retract said sleeve, thereby effecting the building up of a back pressure in said jacket and sleeve preparatory to the subsequent opening of said valve means on reverse movement of the driving member to move the sleeve outwardly of the jacket, whereby the ice cream will be ejected with an initial spurt on opening of the valve means.

9. In a filling apparatus including a valve mechanism, means providing an elongated bore open at one axial end and closed at an opposite axial end; an elongated sleeve member fitting said bore for reciprocation therein to move outwardly and inwardly of said open end thereof, the outer end of the sleeve constituting a discharge nozzle for the effluent flowable material, and the inner end portion of the sleeve having an opening to admit said flowable material from said entrance; valve means including a long stroke member entering said bore from said closed end and reciprocable lengthwise internally of the bore and said sleeve member; abutment means closely adjacent said nozzle engageable by a part movable with said stroke member in the outward direction of movement thereof for intercoupling the same with said sleeve whereby to move the sleeve in the same direction outwardly of said bore; a first valve part fixed in said sleeve and spaced inwardly of said nozzle and said abutment means, and a cooperative second valve part on said reciprocable valve means engageable with said first valve part to shut off the flow to said nozzle responsive to inward movement of said stroke member a predetermined distance less than the full stroke thereof away from said abutment means, and to move said sleeve inwardly of the bore a predetermined substantial distance during the remainder of said inward stroke, whereby to procure valve action at a predetermined position of the sleeve movement in said bore; and means for reciprocating said stroke member.

10. Mechanism as defined in claim 9 further characterized in that said entrance is located relative to said sleeve to be substantially but not entirely closed off at a predetermined position of the sleeve in the bore near an inward limit of movement of the sleeve, whereby to provide a condition of back pressure on closing of the valve with inward movement of the sleeve.

11. Mechanism according to claim 10 further characterized by the provision of a chamber portion in said bore adjacent said entrance and communicating with the latter and said sleeve in the inwardly disposed condition thereof whereby to confine a predetermined volume of said flowable material under said back pressure responsive to movement of the sleeve to said inward limit.

12. A valve structure including a jacket and a sleeve reciprocable therein with a discharge nozzle at an end of the sleeve to be advanced in a direction outwardly of the jacket; and valve means including an actuating member reciprocable internally lengthwise of the sleeve; inner and outermost axially-spaced-apart members situated in the sleeve closely adjacent said nozzle, the innermost one of said members constituting a valve seat, and the outermost one of the same constituting an abutment engageable by a part movable with said actuating member in the outward direction of travel thereof; and a valve member carried by said actuating member and engageable in closing valve action with said innermost spaced-apart member during inward movement of the actuating member, whereby to cause the sleeve to move inwardly and outwardly responsive to corresponding movements of the reciprocable actuating member into and out of engagement with said inner and outermost members, and to procure valve action at certain sleeve positions during the inward and outward travel of the sleeve.

References Cited in the file of this patent

UNITED STATES PATENTS

| 2,107,987 | Johnson | Feb. 8, 1938 |
| 2,144,628 | Hothersall | Jan. 24, 1939 |
| 2,670,116 | Johansen | Feb. 23, 1954 |
| 2,722,177 | Routh | Nov. 1, 1955 |
| 2,758,553 | Moser | Aug. 14, 1956 |
| 2,784,681 | Orrell | Mar. 12, 1957 |
| 2,850,990 | Rasmusson | Sept. 9, 1958 |